(12) United States Patent
Ellingson et al.

(10) Patent No.: US 6,203,846 B1
(45) Date of Patent: Mar. 20, 2001

(54) GEL-BASED MARKING SYSTEM

(75) Inventors: Robert O. Ellingson, Redcliff; Stephen G. Penzes, Medicine Hat; Mick Saruwatari, Calgary; Kevin Saruwatari, Calgary; Craig Poulsom, Calgary, all of (CA)

(73) Assignee: Her Majesty the Queen in right of Canada, as represented by the Minister of National Defence of Her Majesty's Canadian Government, Ottawa (CA)

( * ) Notice: Subject to any disclaimer, the term of this patent is extended or adjusted under 35 U.S.C. 154(b) by 0 days.

(21) Appl. No.: 09/268,355

(22) Filed: Mar. 16, 1999

Related U.S. Application Data

(62) Division of application No. 09/054,397, filed on Apr. 3, 1998, now Pat. No. 6,026,135.
(60) Provisional application No. 60/041,929, filed on Apr. 4, 1997.

(51) Int. Cl.⁷ ....................................................... B05D 5/00
(52) U.S. Cl. .......................... 427/137; 427/136; 427/154; 427/155; 510/406
(58) Field of Search ................................. 427/136, 137, 427/155, 154; 510/406, 419; 252/408.1

(56) References Cited

U.S. PATENT DOCUMENTS

| | | | |
|---|---|---|---|
| 5,165,966 | * 11/1992 | Adams | 427/256 |
| 5,307,272 | 4/1994 | Butler et al. | |
| 5,670,469 | * 9/1997 | Dingus et al. | 510/274 |
| 5,735,940 | * 4/1998 | Coller | 106/31.01 |
| 5,844,039 | * 12/1998 | Scranton et al. | 524/530 |
| 5,876,995 | * 3/1999 | Bryan | 435/189 |

FOREIGN PATENT DOCUMENTS 2174496  2/1999 (CA).

OTHER PUBLICATIONS

"The Detection of Buried Explosive Objects", McFee et al., Can. J. Remote Sensing 6, p. 104, Dec. 1980.
"Advances in the Location and Identification of Hidden Explosive Munitions (U)", McFee et al., Suffield Report 548, Feb. 1991. Unclassified.
"Crad Countermine R&D Study—Final Report (U)", McFee et al., Suffield Special Publication 174, Apr. 1994. Unclassified.

(List continued on next page.)

*Primary Examiner*—Shrive Beck
*Assistant Examiner*—Jennifer Calcagni
(74) *Attorney, Agent, or Firm*—Larson & Taylor, PLC

(57) ABSTRACT

Apparatus and process for marking a surface with a highly visible and substantive mark comprising mixing a dry granular, free-flowing superabsorbent polymer powder with liquid, preferably water, and dye to form a semi-solid gel and depositing the gel onto the surface to be marked. The marking apparatus comprises a chamber for mixing the gel and a ram used to eject the gel from the chamber without excess mechanical agitation and without causing significant breakdown of the gel. The dye makes the gel very visible, the bulk of the gel makes it more easily visible, the nature of the gel makes it temporary; easily dispersed with time, sunlight or water.

11 Claims, 8 Drawing Sheets

OTHER PUBLICATIONS

"IR Contrast Prediction of Shallowly Buried Objects by Characterizing the Temperature Gradient into the Soil", Simard, Patent Disclosure, Jan. 24, 1996.

"Fused Airborne Sensor Technology", Summey et al., Proc. SPIE Conference on Detection and Remediation Technologies for Mines and Mine–like Targets, vol. 2765, Orlando, Fl, USA, Apr. 9–12, 1996, pp. 226–232.

"Multisensor Application for Mines and Minelike Target Detection in the Operational Environment", Hanshaw, Proc. SPIE Conference on Detection and Remediation Technologies for Mines and Mine–like Targets, vol. 2765, Orlando, FL, USA, Apr. 9–12, 1996, pp. 249–258.

"A Multisensor System for Mine Detection", Garriott et al., Proc. SPIE Conference on Detection and Remediation Technologies for Mines and Mine–like Targets, vol. 2765, Orlando, FL, USA, Apr. 9–12, 1996, pp. 259–268.

"IGMMDT: A Multisensor Approach to Mine Detection", Gorman, Proc. SPIE Conference on Detection and Remediation Technologies for Mines and Mine–like Targets, vol. 2765, Orlando, FL, USA, Apr. 9–12, 1996, pp. 269–274.

"Multisensor Fusion for the Detection of Mines and Mine-like Targets", Hanshaw, Proc. SPIE Conference on Detection Technologies for Mines and Mine–like Targets, vol. 2496, Orlando, FL, USA, Apr. 17–21, 1995, pp. 152–158.

"Model–Based Sensor Fusion for Minefield Detection", Bargel et al., Proc. SPIE Conference on Detection Technologies for Mines and Mine–like Targets, vol. 2496, Orlando, FL, USA, Apr. 17–21, 1995, pp. 509–518.

* cited by examiner

GEL-BASED MARKING SYSTEM

CROSS REFERENCE TO RELATED APPLICATION

This is a division of application Ser. No. 09/054,397, filed Apr. 3, 1998 now U.S. Pat. No. 6,026,135. Reference numerals used in the parent application have been retained herein for cross-reference consistency.

This application claim benefit to provisional application Ser. No. 60/041,929 Apr. 4, 1997.

FIELD OF THE INVENTION

The invention relates to apparatus and method for depositing a substantive, highly visible, yet temporary mark on a surface, the mark being formed of a superabsorbant polymer, water and dye mixture.

BACKGROUND OF THE INVENTION

While the invention is described in the context of marking the location of mines, it is anticipated that the novel mark can be applied wherever a location needs to be identified.

In the process of identifying mines, it needs to be marked for subsequent neutralization, usually by digging it out of the ground. The existing line marking and other spray paint means are substantially without mass, are difficult to place on ground and are only visible if viewed substantially straight on. Further, paints and the like are usually associated with toxicity and are semi-permanent. There is opportunity and a need for a temporary, environmentally friendly and highly visible marking scheme.

SUMMARY OF THE INVENTION

It is critical that the location of a possible mine be reliably marked for subsequent neutralization. Once an object has been confirmed as a mine, the object or the ground in which it lies is marked by placing a substantive, visible and temporary mark on the ground.

In a broad aspect, a process is provided comprising mixing a dry granular, free-flowing superabsorbent polymer powder with liquid, preferably water, and dye to form a semi-solid gel and depositing the gel onto the surface to be marked. The dye makes the gel very visible, the bulk of the gel makes it more easily visible, the nature of the gel makes it temporary; easily dispersed with time, sunlight or water.

The above process is effected using apparatus comprising a ram used to eject the gel from a mixing chamber without introducing excess mechanical agitation and thus without causing significant breakdown. Preferably the apparatus comprises a first cylinder with a ram moveably therein to alternately open to form a gel mixing chamber and then close to eject the gel contents. Further, a second cylinder and ram is provided, preferably directed through a manifold to supply the liquid. The manifold can also co-ordinate the introduction of liquid and dry polymer powder into the first cylinder.

The resultant mark is bulky and thus highly visible from the side. The mark's visibility continues for several hours and after its useful life, the mark degrades in an environmentally friendly manner, substantially disappearing completely in 48 hours under drying, sunlight or rain conditions.

DETAILED DESCRIPTION OF THE PREFERRED EMBODIMENT

Figure 1:
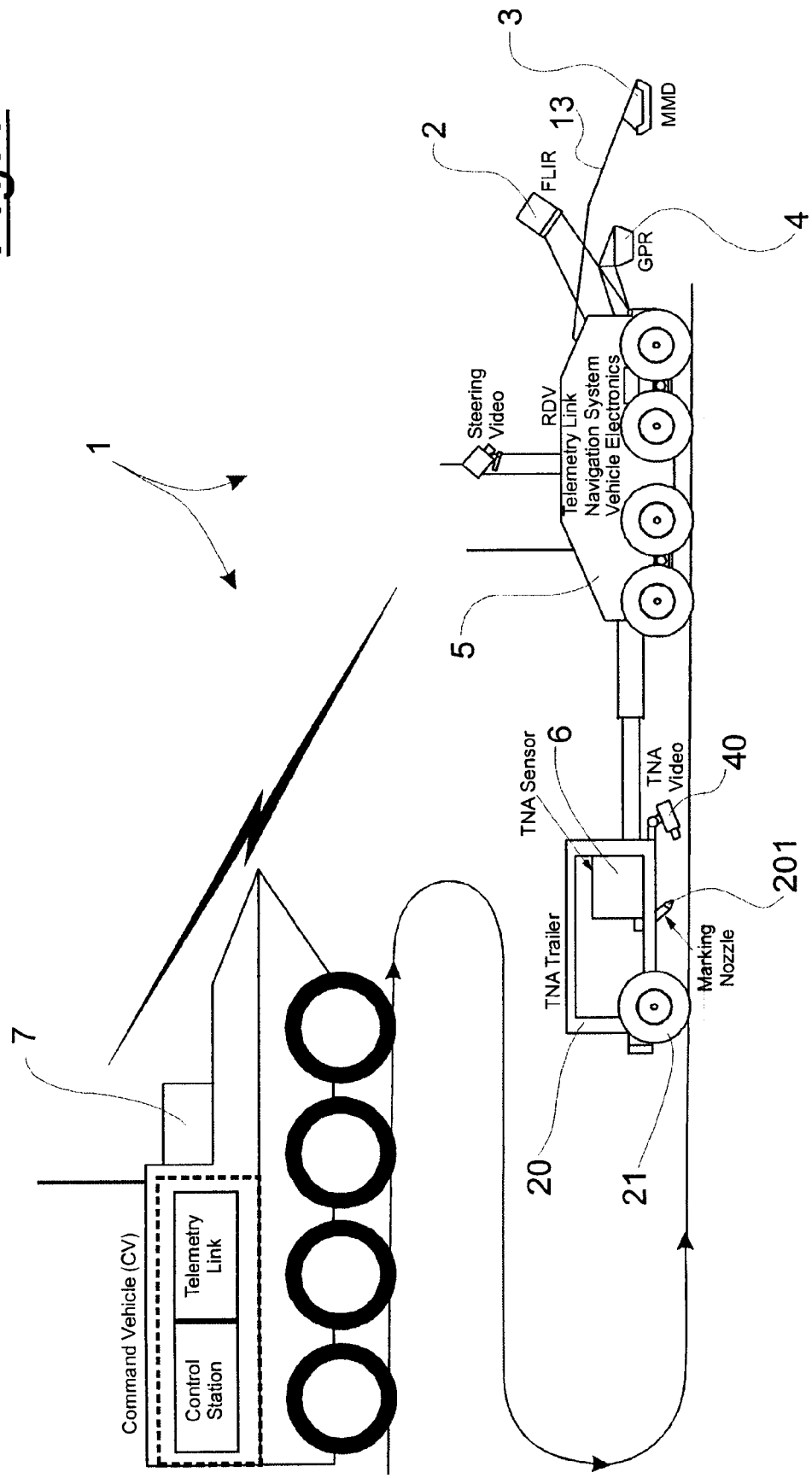
FIG. 1 is a schematic side view of a mine detecting vehicle.

Having reference to FIG. 1, a mine detector vehicle comprises leading sensors 2, 3, 4, a remote-controlled detection vehicle 5, a trailing sensor 6 and a following command vehicle 7. The illustrated vehicle is described in great detail in the co-pending parent application.

The leading sensors identify targets of interest ("TOI"). The trailing sensor 6 is a device, mounted in a maneuverable trailer 20, which is capable of confirming whether a TOI is a mine.

A marking system is located on trailer 20 and comprises a marking assembly 201 for placing a physical mark on the ground at the confirmed location of a mine. Subsequently, the mark is referenced for safely re-locating the mine for neutralization.

Figure 2:
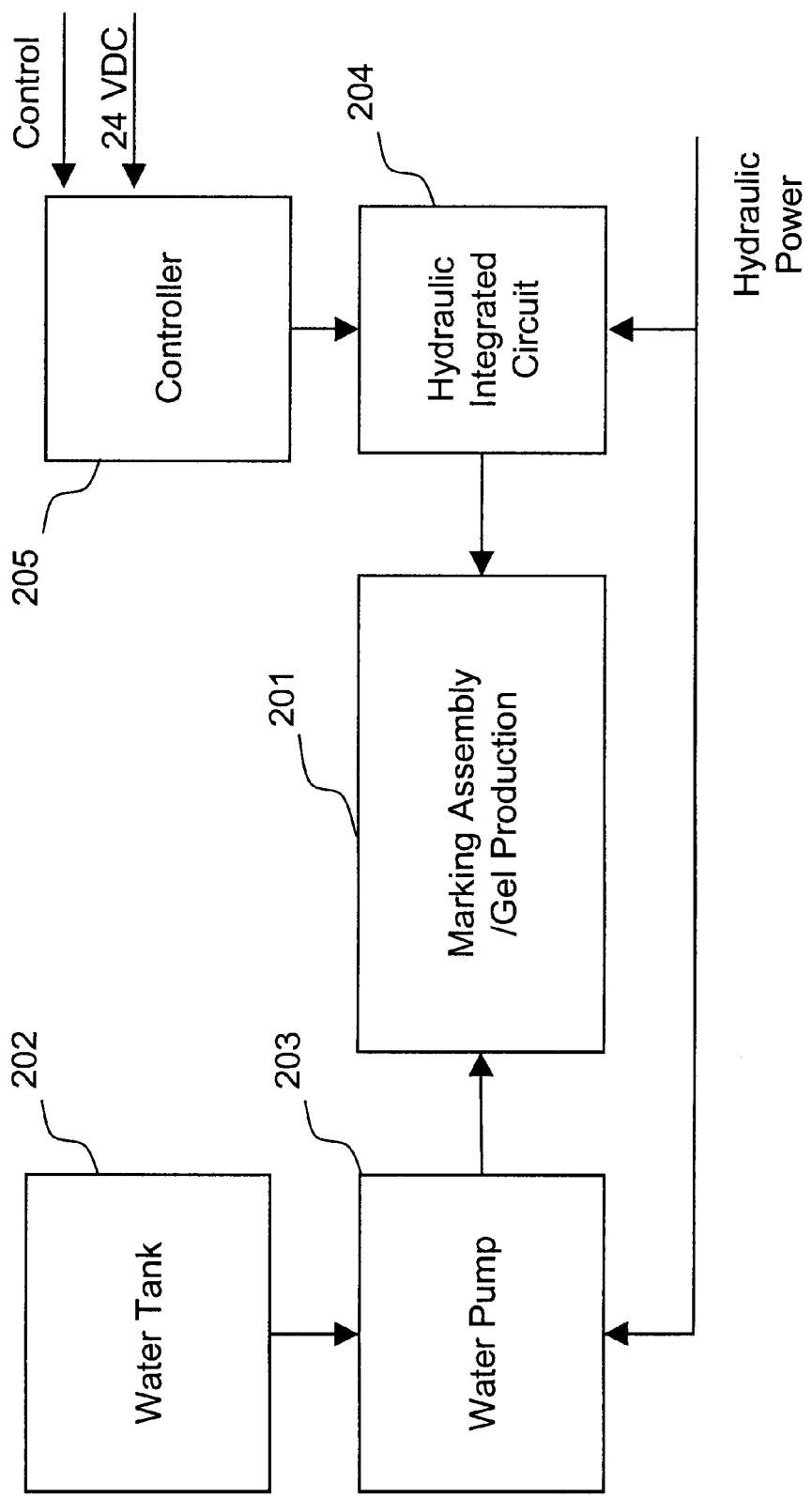
FIG. 2 is a flow chart of the novel marking system.
Figure 3:
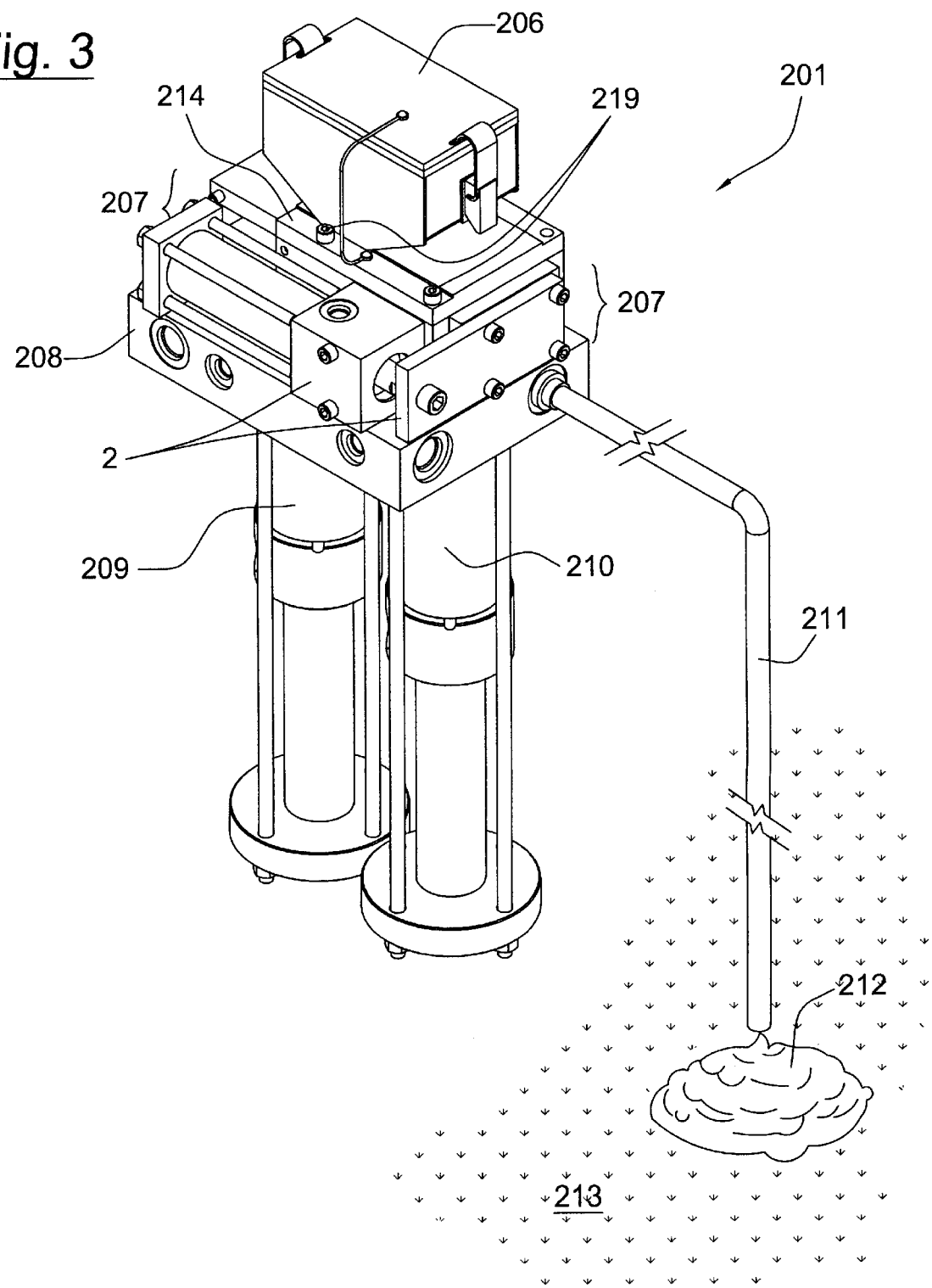
FIG. 3 is a perspective view of the marking apparatus according to one embodiment of the marking system.

Having reference to FIGS. 2, 3, a marking assembly 201 is provided comprising novel apparatus and method. Generally, as described below, a dry granular longchain polymer powder is mixed with a highly visible dye and water. The polymer swells to form a gel product having a wet volume about 20 times the dry powder volume. This highly visible gel product is deposited on the ground at the position which is to be marked. The gel product has a physical bulk which is more easily visible than is a substantially mass-less mark. Combined with a highly visible dye, the mark very effective. When placed on the ground to mark the presence of a mine, the location is safely and clearly marked for several or more hours before planned degradation lessens its effectiveness.

More specifically, and having reference to FIG. 2, the marking system comprises a gel production and marking assembly 201, water supply tank 202 and pump 203, a hydraulic power circuit 204 and a 24VDC controller 205.

Turning to FIG. 3, the assembly 201 for making and depositing the gel product comprises a dry powder hopper 206, a metering head 207, a mixing and injecting manifold 208, a water ram 209, a gel product ram 210 and a gel product discharge tube 211. The gel product or mark 212 is discharged onto the ground 213 from the discharge tube 211.

In more detail and referring to FIGS. 3–6b, the hopper 206 is mounted atop a base plate 214. The hopper 206 is located above the metering head 207 for permitting gravity discharge of its dry powder through a hopper discharge port 215 (seen in FIG. 6a, 6b). The metering head 207 comprises: a guide block 217 sandwiched between a top metering plate 216 and a bottom isolating plate 218. The metering head 207 itself is sandwiched between the hoppers base plate 214 and the manifold 208.

The hopper's base plate 214, metering plate 216, guide block 217, isolating plate 218 and manifold 208 are stacked and incorporate seals between each component. The hopper base plate 214, guide block 217 and manifold 208 are in fixed space relation to each other using two opposing sets of four bolts 219 each, and are spaced from each other by the metering and isolating plates 216, 218. The metering and isolating plates 216, 218 are laterally movable using a double acting hydraulic actuator 220. The actuator 220 is connected to a slider bracket 221 which links the metering and isolating plates 216, 218 together for synchronous, sliding movement.

The guide block 217 has a "H"-shaped cross section for forming a pair of upper side walls 222 and a pair of lower side walls 223 for containing the metering and isolating plates 216, 218 during sliding movement.

Each of the hopper base plate, metering plate, guide block, isolating plate and manifold have complementary ports formed therethrough for gravity passage of the dry powder. Dry powder discharges through the hopper port 215. A metering port 224 is formed in the metering plate 216. Port 225 is formed through the guide block 217. Port 226 is formed through isolating plate 218. Finally, a port 227 is formed through the manifold 208.

The hopper base plate port 215 is laterally shifted from the guide block and manifold ports 225, 227 so that at no time is there a continuous path from the hopper 206 through to the manifold 208. The guide block port 217 is always aligned with the manifold port 227.

Figure 6A:
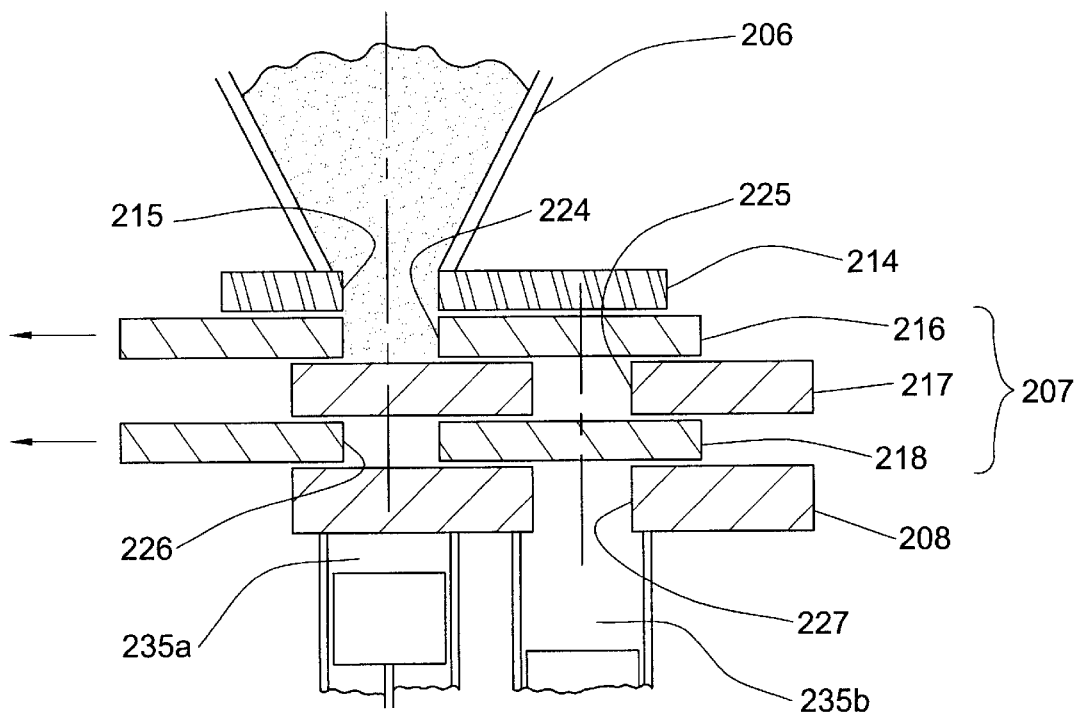
FIG. 6a is a schematic cross-sectional view of the apparatus in the powder charging position.
Figure 6B:
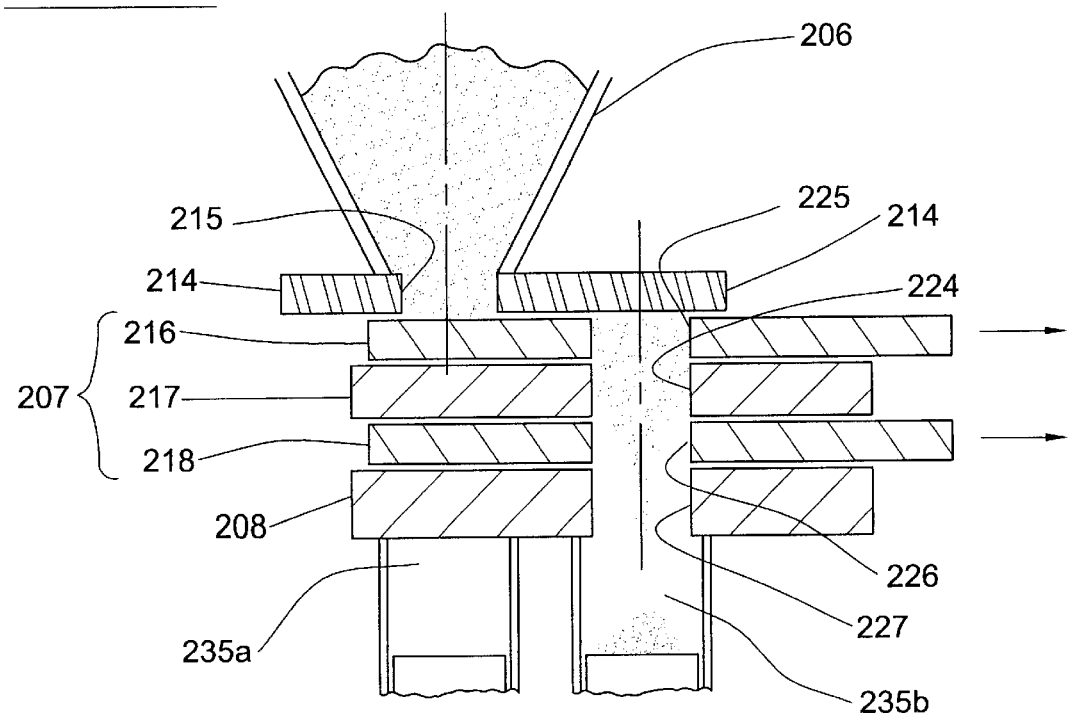
FIG. 6b is a schematic cross-sectional view of the apparatus in the powder discharging position.

The metering and isolating plates 216, 218 are movable between a powder charging position (FIG. 6a) and a powder discharging position (FIG. 6b).

In the powder charging position, the metering port 224 (and isolating port 226) are actuated with actuator 220 so as to align with the hopper base plate port 215. This action takes the metering and isolating ports 224, 226 out of alignment with the guide block port 225.

In the discharging position, the metering port 224 (and isolating port 226) are actuated to align with the guide block port 225 for discharging metered powder through the manifold port 227.

Figure 4:
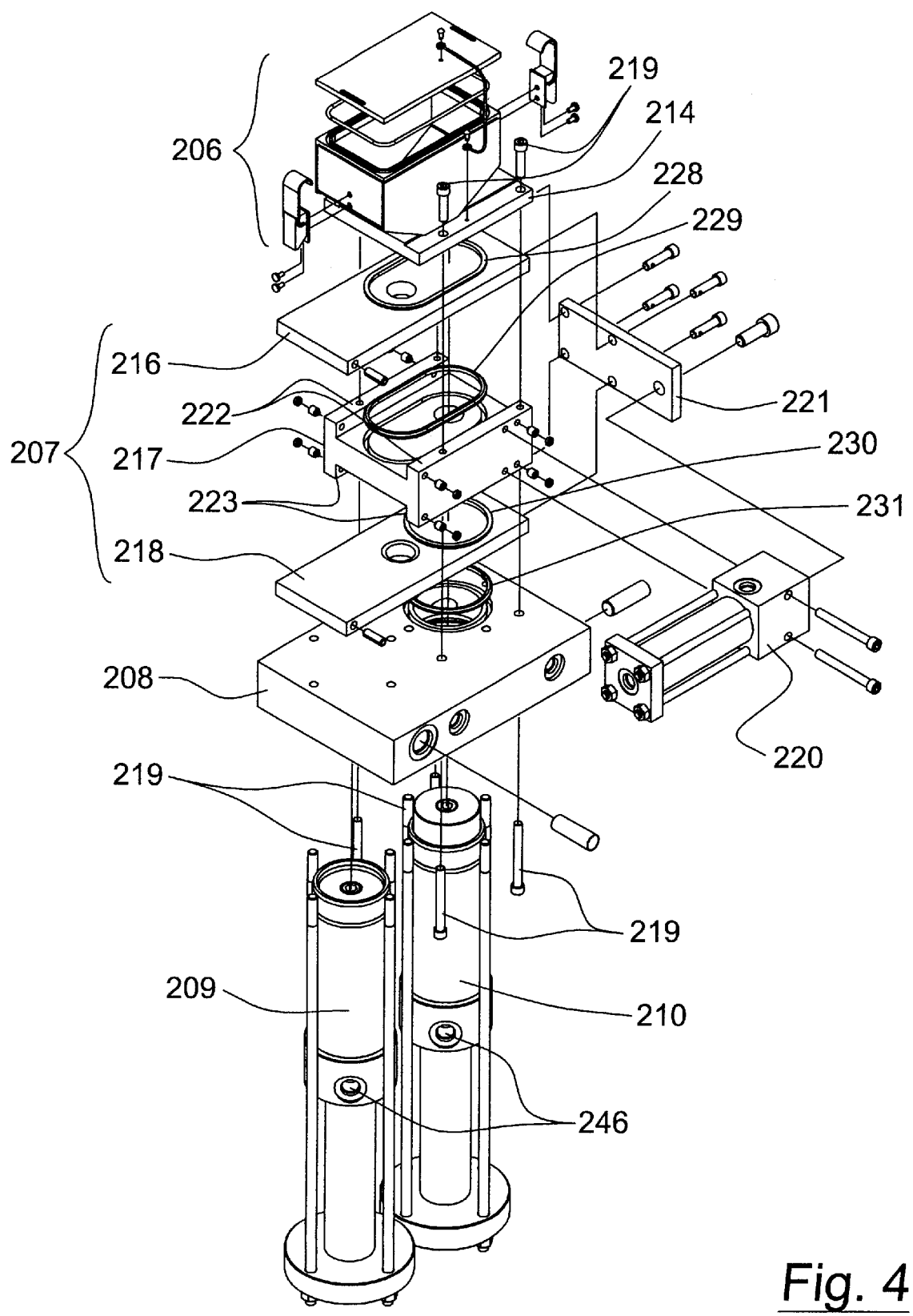
FIG. 4 is a perspective exploded view of the marking apparatus according to FIG. 3.

Best seen in FIG. 4, oblong seals 228, 229 are situated in the two interfaces between the hopper base plate 214, metering plate 216, and guide block 217. The oblong shape of the two seals 228, 229 maintains a continuous seal between the hopper base plate port 215 and metering plate port 224, and between the metering plate port 224 and guide plate port 225 throughout the powder charging and discharging positions.

Circular seals 230, 231 are situated in the two interfaces formed between the guide block 217, the isolating plate 218 and the manifold 208. The isolating plate port 226 moves into the circular sealed area in the discharge position. In the powder charging position, the isolating plate port 226 moves out of the sealed area for isolating the manifold 208 from the metering head 217.

Figure 7:
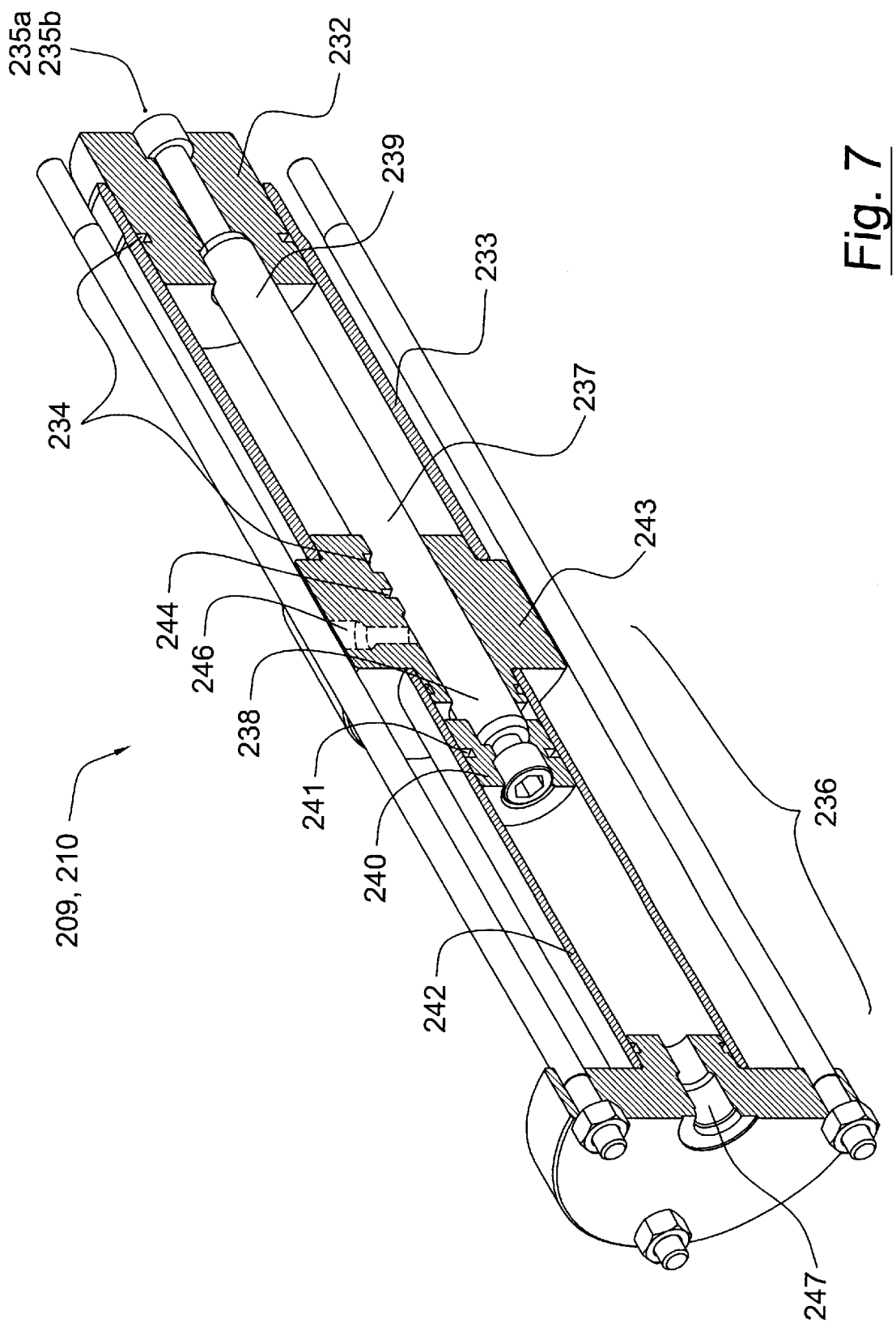
FIG. 7 is a cross-sectional view of a hydraulic actuator and ram used for both the water ram and the product ram.

Beneath the manifold 208 is mounted a pair of hydraulically operated rams; the water ram 209 and the gel product ram 210. Best seen in FIG. 7, rams 209, 210 have pistons 232 movable within cylinders 233. The pistons 232 have annular seals 234 for forming a water chamber 235a and product chamber 235b within their respective cylinders 233. The pistons 232 are independently operated with double acting hydraulic actuators 236. The cylinders 233 seal to the underside of the manifold 208, secured with long studs 245. Each hydraulic actuator 236 has a piston rod 237 having a first end 238 and a second end 239. A hydraulic piston 240 and annular piston seals 241 are mounted at the piston rod's first end 238. The hydraulic piston 240 is operable within a hydraulic cylinder 242 separated from the water and product chambers 235a, 235b by bulkhead 243 and annular seal 244. The water and product pistons 232 are mounted at the second ends 239 of the piston rods 237. A first hydraulic port 246 (FIG. 3 and fancifully depicted in dotted lines in FIG. 7) in the bulkhead 243 introduces hydraulic fluid to the hydraulic actuator 236 to drive the piston rod 237 and its respective water and product piston 232 away from the manifold 208, forming their respective water and product chambers 235a, 235b. A second hydraulic port 247 introduces hydraulic fluid to the hydraulic actuator to drive its respective water and product piston 232 towards the manifold 208 for ejecting the contents of their respective chambers 235a, 235b.

The manifold port 227 extends completely through the manifold 208 from the metering head 207 to the product chamber 235b of the product ram 210 located directly below the port 227 (FIGS. 4, 6a, 6b).

Figure 5A:
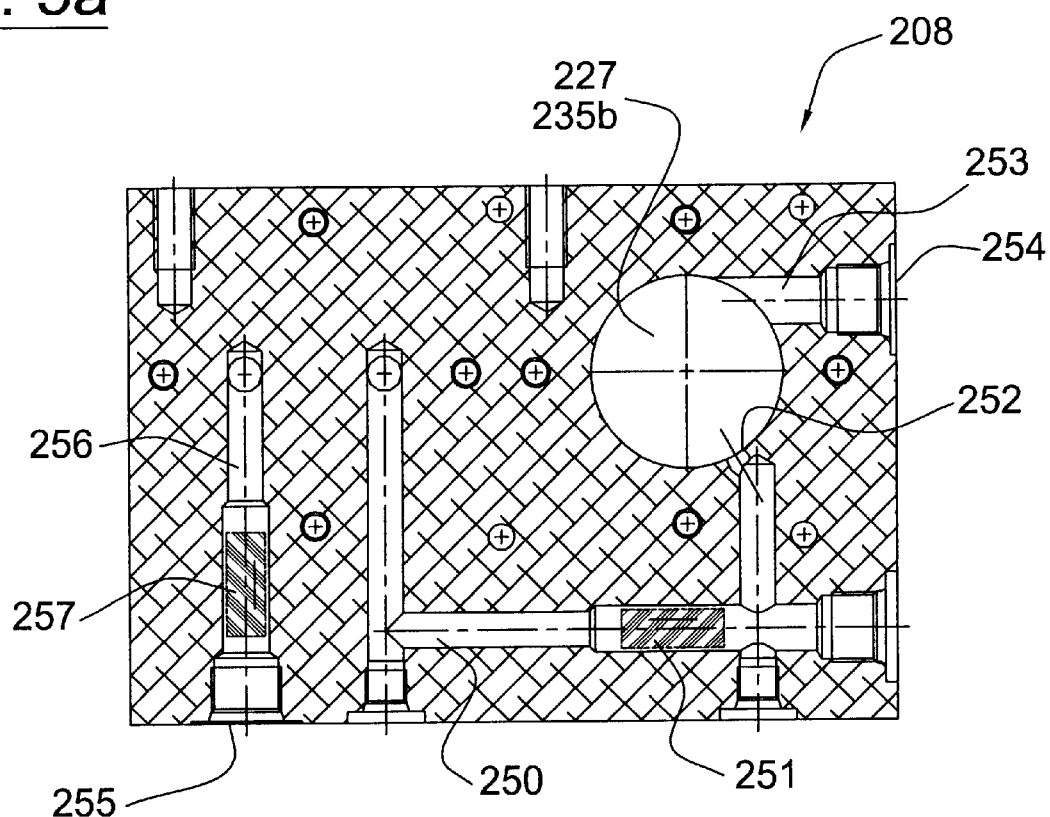
FIG. 5a is a cross-sectional view through the center of the mixing and discharge manifold according to FIG. 3.
Figure 5B:
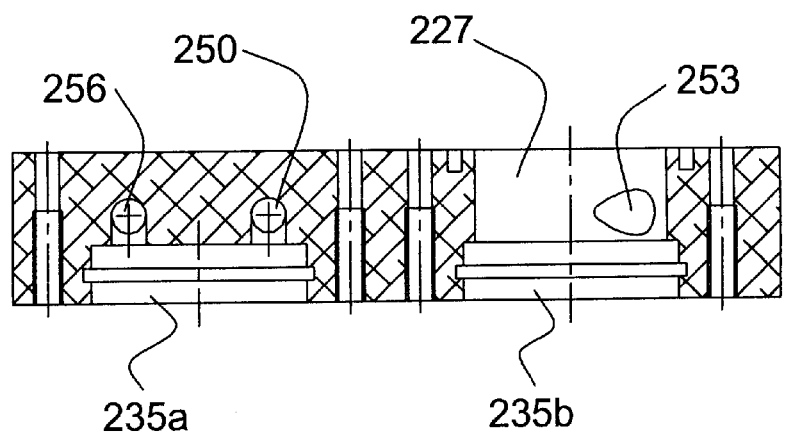
FIG. 5b is a cross-sectional side view of the mixing and discharge manifold as sectioned through the center of the ram chambers according to FIG. 3.

Having reference to FIGS. 5a, 5b, the manifold 208 routes powder, water and product gel to and from the water and product rams 209, 210. A first passage 250 extends from the water ram 209 and chamber 235a, through the manifold 208 and into the product ram 210 and chamber 235b. The water passage 250 is interrupted with a valve, such as a check valve 251 for permitting water flow from the water chamber 235a to the product chamber 235b but not in the reverse direction. The first passage 250 exits into the product chamber 235b through discharge 252, angled downwardly towards the product ram's piston 232. A second passage 253 extends from the product chamber 253b, through the manifold 208 and to a gel product outlet port 254. A product discharge tube (FIG. 3) conducts gel product from the outlet port 254 to the marking site. Port 255 is provided for routing water supply through a third passage 256 to the water chamber 253a. The third passage 256 is fitted with a check valve 257 to permit water to enter the water chamber 253a but not exit that way.

A superabsorbant powdered long chain polymer is used such as Potassium Polyacrylate, polycarbonate or polymer available under the tradename "DriMop" or SaniSorb" from Multisorb Technologies, Inc., Buffalo, N.Y. These and other similar polymers are often used in liquid spill control and activate when mixed with water to form a gel product. When mixed at ratio of about 95:5 water:powder by volume the polymer powder absorbs nearly 20 times its volume in water and forms a semi-solid gel. The gel is not robust and breaks down under mechanical agitation and UV exposure. About 97% of the polymer is biodegradable.

Environmentally friendly, forestry-marking dyes are available in liquid form as "Fluorescent Dye" from Forestry Suppliers, Inc., Jackson, Miss. Some dyes are suitable for use with potable water such as "Rhodamine WT".

In operation, dye is premixed with water (for Fluorescent Dye, concentrations of about 0.1% are sufficient). The hopper is filled with powdered polymer.

Having reference to FIGS. 6a, 6b, the metering and isolation plates 216, 218 are cycled between the charging and discharging positions in the respective figures. The position of the metering and isolating plates 216, 218 dictates the timing of product ram 209 charging with powder and the ejection of gel product.

Figure 8:
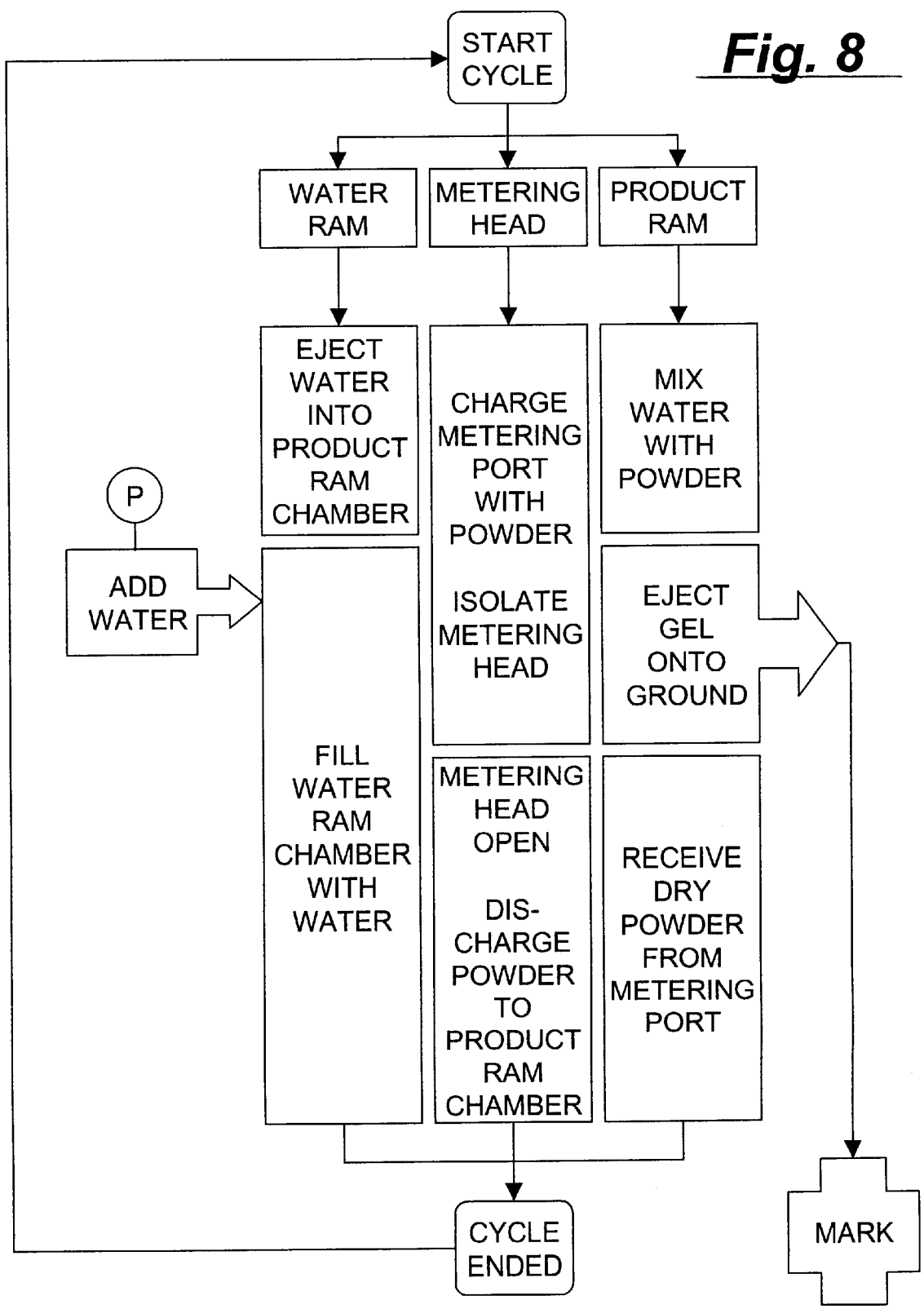
FIG. 8 is flow chart of the water and product ram cycles for taking on water and powder respectively, mixing and making the gel product and discharging the gel product.

The charging/discharging cycle is illustrated in FIG. 8.

When actuated to the charging position (FIG. 6a), the following occurs. The ⅞" diameter by ½" deep metering port 224 is moved to the charging position under the hopper discharge port 215 for accepting a metered volume of the polymer powder. The isolation plate 218 seals the manifold 208 from the metering head 207 and hopper 206.

While the metering and isolation plates 216, 218 are still at the charging position, the following steps can occur. The water ram 209 is actuated to move water from the water chamber 235a, through the first passage 250 and into the product chamber 235b for mixing with polymer powder present from the previous cycle. Air is bled from the product chamber 235b while water is transferred. The water and powder mix to form the gel product. The product ram 210 is then actuated for pressurizing and ejecting the gel product out through the manifold's second passage 253 and the discharge tube 211 without subjecting the gel product to excessive mechanical agitation or flow-back into the metering head 207 or hopper 206.

When actuated to the discharging position (FIG. 6b), the following occurs. The metering plate port 224 is positioned to discharge the metered polymer through the aligned guide block 217, isolation plate 218 and manifold ports 227 so that it enters the product chamber 235b of the product ram 210. The metering plate 216 seals the hopper discharge port 215. As it is disadvantageous to contaminate the guide block isolation plate ports 217, 218 of the metering head 207, it is necessary to return the metering and isolation plates 216, 218 to the charging position before mixing the gel product and discharging it.

If the discharge point of the discharge tube 211 is known relative to the location of the object or site to be marked then the tube so directed to that location for discharge of the marking gel product.

If the marking apparatus is not going to be used right away, it is flushed with water to clean the product chamber 235b, manifold port 227, second passage 253 and product discharge tube 211 of gel product.

Optionally, powdered dye can be added to the polymer powder before mixing.

Once discharged, the product gel has the following advantages:

it is visible even from the side due to its bulk, and highly visible due to the dye, visibility continuing for several hours and in even low light conditions using a fluorescent dye;

the gel components are easily obtained, stored and are inexpensive;

the apparatus is simple, requires little maintenance and easy to operate; and after its useful life of several hours, the mark (gel product) degrades in an environmentally friendly manner, substantially disappearing completely in 48 hours under drying, sunlight or rain conditions.

The embodiments of the invention in which an exclusive property or privilege is claimed are defined as follows:

1. A process for placing a visible temporary mark on a horizontal surface, said process comprising the steps of:

providing a dry granular, free-flowing superabsorbent polymer powder and a visible dye;

providing a cylinder having a closed end and a piston movable therein wherein a mixing chamber is formed between the closed end and the piston, and the closed end includes an outlet;

combining the polymer powder, the dye, and a liquid in the mixing chamber so as to form a semi-solid gel;

moving the piston within the cylinder towards the closed end so as to reduce the volume of the mixing chamber; and displacing the gel from the cylinder and out of the outlet so as to deposit the gel onto the surface to be marked.

2. The process as recited in claim 1 further comprising the step of mixing the dye with the liquid before combining the dye and the liquid with the polymer powder.

3. The process as recited in claim 1 further comprising the step of:

providing the dye as a dry granular powder; and mixing dye with the polymer powder before combining the dye and the powder with the liquid.

4. A process for placing a visible temporary mark on a horizontal surface, said process comprising the steps of:

providing a dry granular, free-flowing superabsorbent polymer powder and a visible dye;

combining the polymer powder, the dye, and a liquid in a mixing chamber so as to form a semi-solid gel, wherein the mixing chamber is a cylinder; and moving a piston within the cylinder to reduce the volume in the mixing chamber so as to displace the gel from an outlet in the chamber and to deposit the gel onto the surface to be marked.

5. The process as recited in claim 4 further comprising the step of mixing the dye with the liquid before combining the dye and the liquid with the polymer powder.

6. The process as recited in claim 4 further comprising the steps of:

providing the dye as a dry granular powder; and mixing dye with the polymer powder before combining the due and the powder with the liquid.

7. The process as recited in claim 5 wherein the liquid is water.

8. The process as recited in claim 6 wherein the liquid is water.

9. The process as recited in claim 4 wherein the surface to be marked is the ground.

10. A process for placing a visible temporary mark on the ground at a site, said process comprising the steps of:

identifying the location of the site;

providing a dry granular, free-flowing superabsorbent polymer powder and a visible dye;

combining the polymer powder, the dye, and a liquid in a mixing chamber so as to form a semi-solid gel, wherein the mixing chamber is a cylinder; and moving a piston within the cylinder to reduce the volume in the mixing chamber so as to displace the gel from an outlet in the chamber and to deposit the gel at the identified location of the site.

11. The process as recited in claim 10 wherein the identified site is the location of a mine.

* * * * *